United States Patent [19]
Hill et al.

[11] Patent Number: 5,757,497
[45] Date of Patent: May 26, 1998

[54] TWIN BEAM DISPLACEMENT TRANSDUCER

[75] Inventors: Jonathan W. Hill, Scarborough; Gregory A. Morehead, Portland, both of Me.

[73] Assignee: Control Devices, Inc., Standish, Me.

[21] Appl. No.: 741,346

[22] Filed: Oct. 29, 1996

[51] Int. Cl.⁶ .................................................. G01B 11/00
[52] U.S. Cl. ................................... 356/373; 250/231.1
[58] Field of Search .......................... 356/373, 375; 250/214 PR, 559.29, 231.1, 231.11, 231.19

[56] References Cited

U.S. PATENT DOCUMENTS

| | | | |
|---|---|---|---|
| 3,770,353 | 11/1973 | Brown et al. | 356/152 |
| 3,867,037 | 2/1975 | Litke | 356/169 |
| 4,226,535 | 10/1980 | Heitmann et al. | 356/373 |
| 4,549,808 | 10/1985 | Ernst | 356/374 |
| 4,572,607 | 2/1986 | Krizik | 356/373 |
| 4,798,951 | 1/1989 | Walker | 250/227 |
| 4,874,941 | 10/1989 | Spillman, Jr. | 250/237 |
| 5,107,846 | 4/1992 | Atlas | 128/666 |
| 5,229,836 | 7/1993 | Nagano | 356/373 |

*Primary Examiner*—F. L. Evans
*Attorney, Agent, or Firm*—Woodard, Emhardt, Naughton, Moriarty & McNett

[57] ABSTRACT

A twin beam displacement transducer. The transducer utilizes two thin, flexible beams. The two beams either lay intimately on top of one another or both lay intimately on opposite sides of a common spacer. One of the beams, the neutral beam, is rigidly attached to the housing on one end and to the moving object on the other end. The other beam, the sliding beam, is rigidly attached only to the moving object. The other end of the sliding beam is free to move. As the object moves, both the neutral beam and the sliding beam bend. Such bending causes longitudinal displacement of the free end of the sliding beam within the housing. This motion is measured and correlated to the motion of the object, and an electrical output signal is created which is proportional to such motion.

20 Claims, 3 Drawing Sheets

TWIN BEAM DISPLACEMENT TRANSDUCER

TECHNICAL FIELD OF THE INVENTION

The present invention generally relates to displacement transducers and, more particularly, to a twin beam displacement transducer.

BACKGROUND OF THE INVENTION

There are many applications in which it is desirable to measure the motion of a first object with respect to a second object, where the second object is treated as a fixed reference point. For example it is sometimes desirable in the automotive field to measure the relative displacement between a point on the automobile's suspension (the object in motion) and a point on the automobile's frame (the fixed reference point). Such information may be used as an input to an active suspension system of the automobile, for example.

Accordingly, there have been many attempts in the past to design displacement transducers which produce an electrical output signal that is proportional to the amount of displacement between the moving object and the fixed reference point. Such prior art devices normally employ a linkage which is attached to the moving object, wherein the linkage telescopically slides within a housing attached to the fixed reference point. The general configuration of such prior art devices is analogous to a common shock absorber. Electronic circuitry within the housing measures the displacement of the linkage and produces an electrical output signal that is proportional to such displacement. Displacement of the linkage member may be detected by any of several known means, including Hall effect, LVDT, LVIT, variable resistance, rotary optical encoder, etc.

The prior art displacement transducers exhibit several drawbacks. For example, the longitudinal axis of the transducer must generally lie substantially along the axis of motion due to the nature of the linkage/housing engagement. This is not convenient or desirable in many applications. Also, such transducers produce linkage displacement which is as large as the displacement of the object in motion. This requires the linkage and housing to be correspondingly larger as the measured displacement increases. Furthermore, because of the relatively long stroke of the transducer linkage, such prior art transducers are difficult to seal when used in harsh environments.

There is therefore a need for a displacement transducer which overcomes the problems inherent in the prior art devices. The present invention is directed toward meeting this need.

SUMMARY OF THE INVENTION

The present invention relates to a twin beam displacement transducer. The transducer utilizes two thin, flexible beams. The two beams either lay intimately on top of one another or both lay intimately on opposite sides of a common spacer. One of the beams, the neutral beam, is rigidly attached to the housing on one end and to the moving object on the other end. The other beam, the sliding beam, is rigidly attached only to the moving object. The other end of the sliding beam is free to move. As the object moves, both the neutral beam and the sliding beam bend. Such bending causes longitudinal displacement of the free end of the sliding beam within the housing. This motion is measured and correlated to the motion of the object, and an electrical output signal is created which is proportional to such motion.

In one form of the invention a transducer for measuring displacement of an object with respect to a reference point is disclosed, comprising a neutral member having a proximal end fixed to the reference point and a distal end fixed to the object; a sliding member having a free proximal end and a distal end fixed to the object; wherein first displacement of the object in a first plane causes second displacement of the sliding member proximal end in a second, substantially orthogonal plane; and displacement measurement means for measuring the second displacement.

In another form of the invention a transducer for measuring displacement of an object with respect to a reference point is disclosed, comprising a neutral member having a proximal end fixed to the reference point and a distal end fixed to the object; a sliding member having a free proximal end and a distal end fixed to the object; wherein a first displacement of the object causes a second, smaller displacement of the sliding member proximal end; and displacement measurement means for measuring the second displacement.

In another form of the invention a transducer for measuring displacement of an object with respect to a reference point is disclosed, comprising a flexible wire having a first end fixed to the reference point, a substantially 180 degree bend substantially at a midpoint of the wire and a free second end; wherein first displacement of the object in a first plane causes second displacement of the second end in a second, substantially orthogonal plane; and displacement measurement means for measuring the second displacement.

In another form of the invention a transducer for measuring displacement of an object is disclosed, comprising a flexible wire having a first end fixed to a reference point, a substantially 180 degree bend substantially at a midpoint of the wire and a free second end; wherein a first displacement of the object causes second, smaller displacement of the second end; and displacement measurement means for measuring the second displacement.

DETAILED DESCRIPTION OF THE PREFERRED EMBODIMENTS

Figure 1:
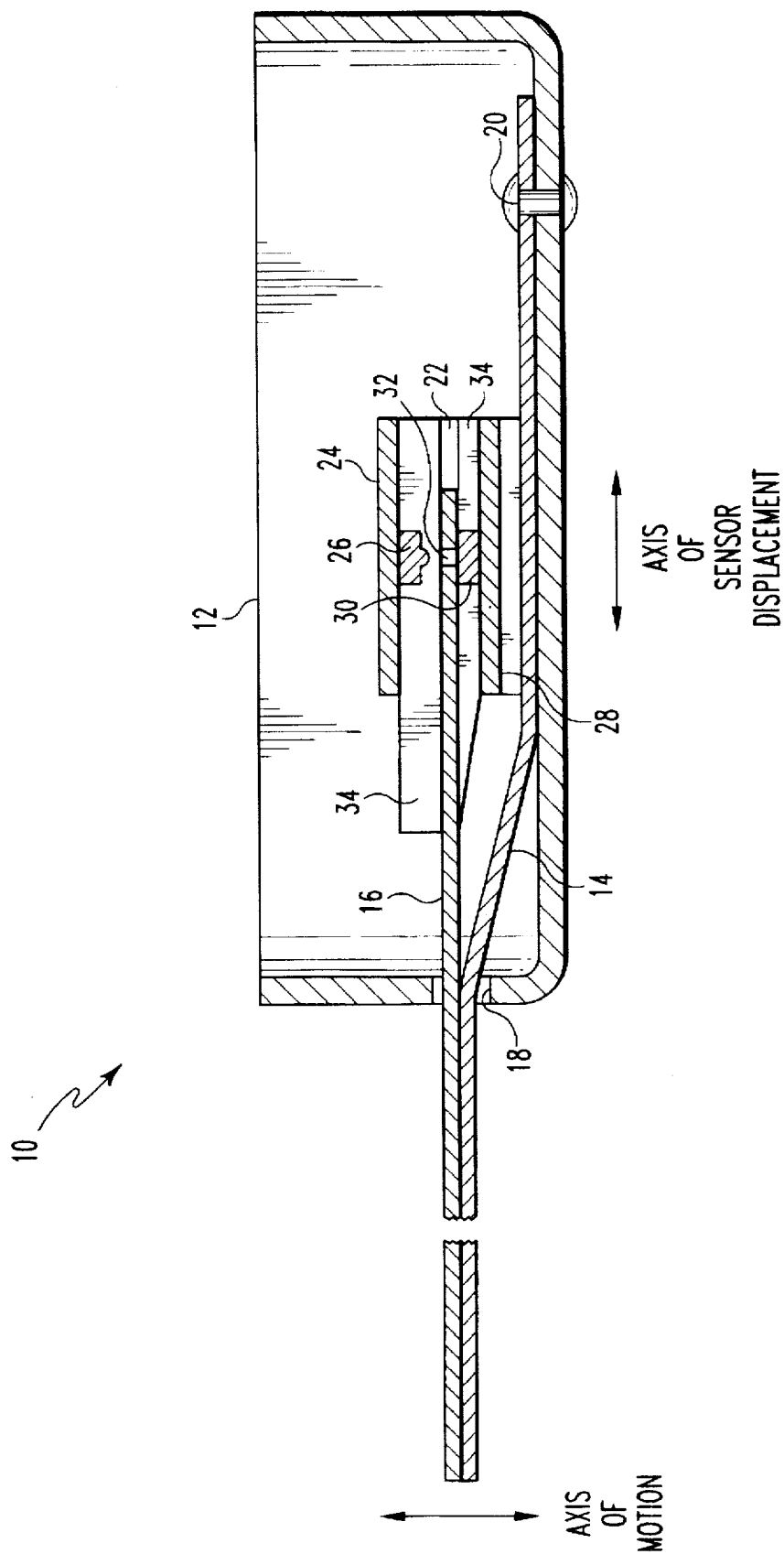
FIG. 1 is a cross-sectional view of a first embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1, a first embodiment of the twin beam displacement transducer of the present invention is illustrated and indicated generally at 10. The displacement transducer 10 includes a housing 12 which is mounted to the point that is designated as the fixed reference point for purposes of measurement. Therefore, the housing 12 is also the fixed reference point. Two thin beams 14 and 16 are partially contained within the housing 12 and partially extend external to the housing 12 through the aperture 18. The beam 14 is referred to as the neutral beam and is rigidly affixed to the housing 12 at the proximal end 20 of the neutral beam 14. The neutral beam 14 extends through the aperture 18 and is coupled to the object in motion at the distal end of the neutral beam 14. The second beam, the sliding beam 16, is also coupled to the object in motion at its distal end and is also preferably coupled to the neutral beam 14 at the distal end. The proximal end of the sliding beam 16 also lies within the housing 12 and extends through the aperture 18. However, the proximal end of the sliding beam 16 is not rigidly attached to the housing 12 and is contained therein only by sliding engagement with two grooves 22 (only one of which is visible in the view of FIG. 1). The beams 14 and 16 are preferably made from a thin, resilient material which has a high shape memory, such as spring steel. It is important that the distance between the beams 14 and 16 be kept constant, either by placing the beams in sliding contact or by fixing the distance with one or more spacers.

When the housing 12 is coupled to the fixed reference point and the distal ends of the beams 14 and 16 are coupled to the object in motion, the arrangement of the beams 14 and 16 form a very precise displacement transducer. With reference to the orientation of FIG. 1, if the axis of motion of the object in motion (not shown) is vertical, then motion of the object will cause bending in both the neutral beam 14 and the sliding beam 16. Movement of the neutral beam 14 with respect to the housing 12 is prevented due to the fact that the neutral beam 14 is rigidly attached to the housing 12. However, the sliding beam 16 is not rigidly attached to the housing 12, and bending of the neutral beam 14 and the sliding beam 16 causes axial displacement of the sliding beam 16 in the horizontal direction of FIG. 1 (i.e. within the groove 22). The present invention therefore translates the measured motion in a first direction into motion of the sliding beam 16 in a second, perpendicular direction.

In order to measure the displacement of the sliding beam 16, and therefore the displacement of the object in motion, the transducer 10 includes a circuit board 24 upon which is mounted a light emitting diode (LED) 26. The LED 26 is oriented in such a manner so as to permit the light produced by the LED 26 to shine upon a region near the proximal end of the sliding beam 16. A second circuit board 28 carries a position sensing diode 30 which is located substantially beneath the LED 26, but on the opposite side of the sliding beam 16. The sliding beam 16 includes an aperture 32 formed therethrough in the region of the LED 26 and the position sensing diode 30. As the sliding beam 16 moves within the grooves 22, the illuminated area on the position sensing diode 30 moves, which in turn changes the output from the position sensing diode 30 as is known in the art. Therefore, displacement of the sliding beam 16 may be sensed by the position sensing diode 30. This displacement of the sliding beam 16 may then be correlated to the displacement of the object in motion. The correlation factor between the two displacements will depend largely upon the length of the sliding beam 16 and the distance between the beams 14 and 16 if a spacer is included. The circuitry for converting between the position sensing diode output and the displacement of the object in motion may either be located within the housing 12 or external thereto. The design of such circuitry is considered to be routine for those having ordinary skill in the art.

Figure 2:
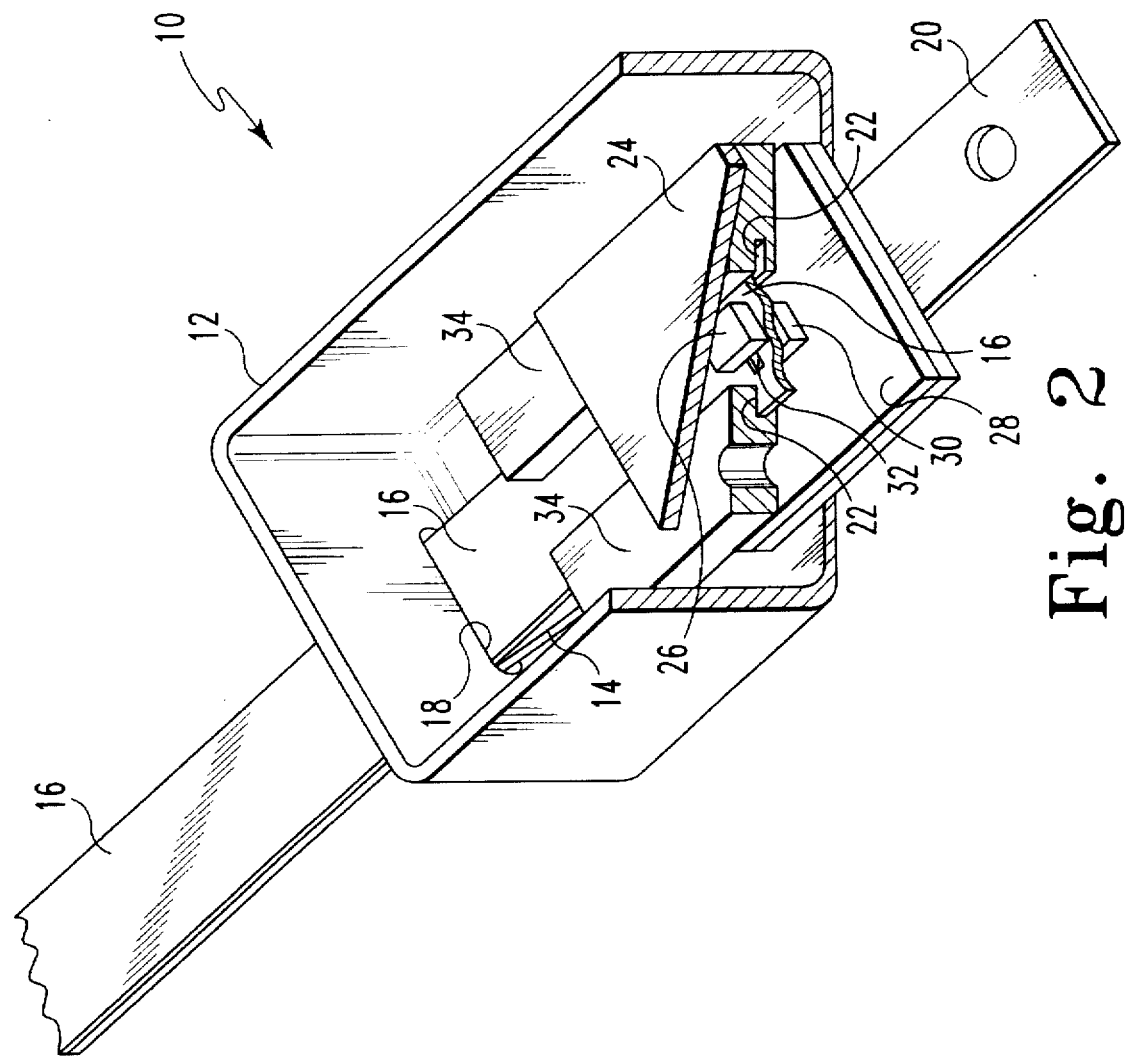
FIG. 2 is a perspective partial cross-sectional view of the first embodiment of the present invention.

Referring to FIG. 2, the first embodiment twin beam displacement transducer 10 is illustrated in a perspective partial cross-sectional view. Clearly visible in the view of FIG. 2 are spacers 34 in which the grooves 22 are formed. The spacers 34 additionally provide separation between the circuit boards 24 and 28 in order to correctly position the LED 26 and the position sensing diode 30. Although the present invention is illustrated with an LED/position sensing diode pair for measurement of the sliding beam 16 displacement, those skilled in the art will recognize that any method for measuring the position of the proximal end of the sliding beam 16 may be used in conjunction with the present invention. For example, any of the prior art techniques discussed in the background of the invention hereinabove may be incorporated into the twin beam displacement transducer of the present invention.

When the twin beam displacement transducer 10 is used in a harsh environment, it may be desirable to seal the housing 12 against penetration by external agents. In this situation, the aperture 18 must be sealed in such a way that it does not interfere with movement of the sliding beam 16. Those skilled in the art will recognize that any of a number of sealing arrangements may be used to achieve this goal, such as a silicone slit valve. Alternatively, the beams may be encased in a flexible casing, such as rubber or nylon, and the proximal end of this casing may be sealed to the housing 12. Because of the relatively small stroke of the sliding beam 16, sealing of the aperture 18 is much more easily accomplished than sealing in most of the prior art devices.

Another method of sensing the displacement of the sliding beam 16 with respect to the housing 12 is to use a photodiode in place of the position sensing diode 30 in conjunction with a fixed aperture over the photodiode (not shown). The interaction between the fixed aperture and the aperture 32 in the sliding beam 16 creates a variable sized aperture, the size of this aperture changing with motion of the sliding beam 16. Therefore, as the sliding beam 16 moves, the aperture size will change, thus changing the amount of light that reaches the photodiode. The output voltage of the photodiode will therefore produce a linear voltage change in proportion to movement of the sliding beam 16.

Figure 3:
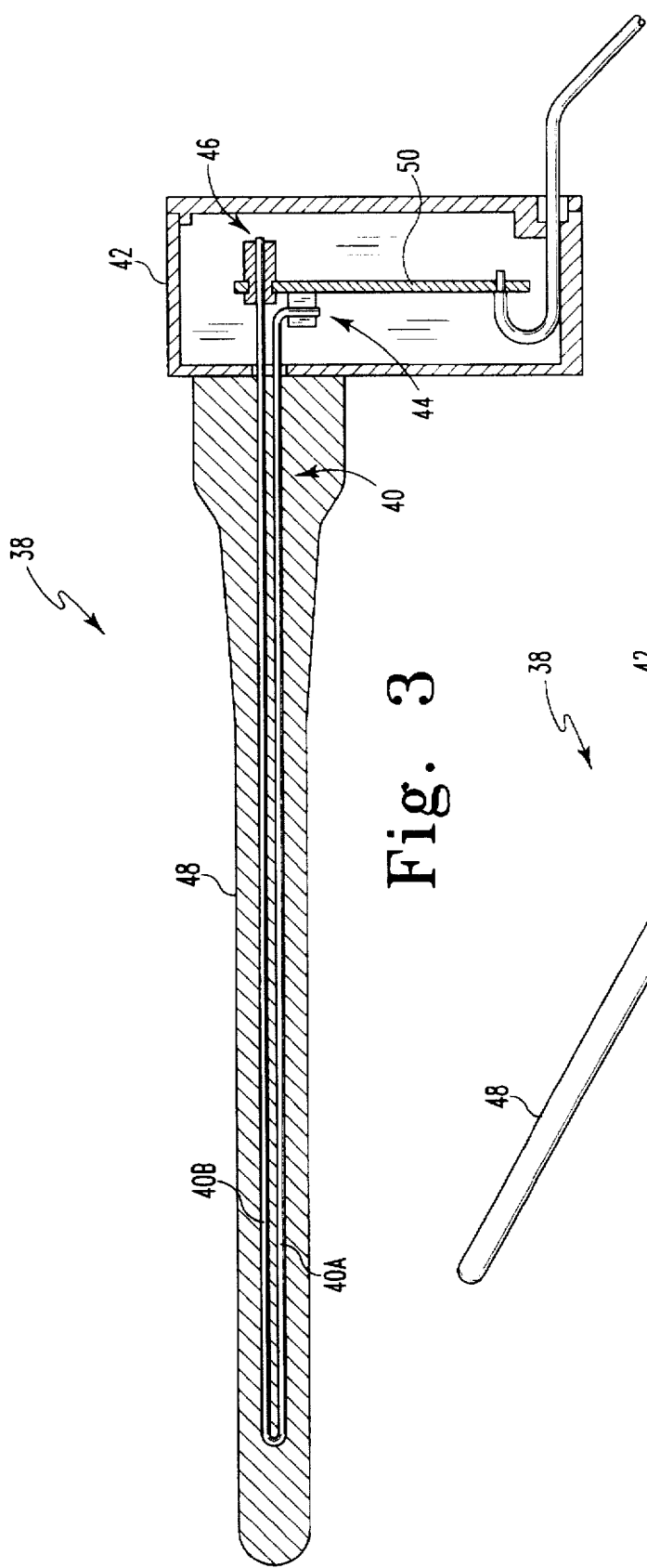
FIG. 3 is a cross-sectional view of a second embodiment of the present invention.
Figure 4:
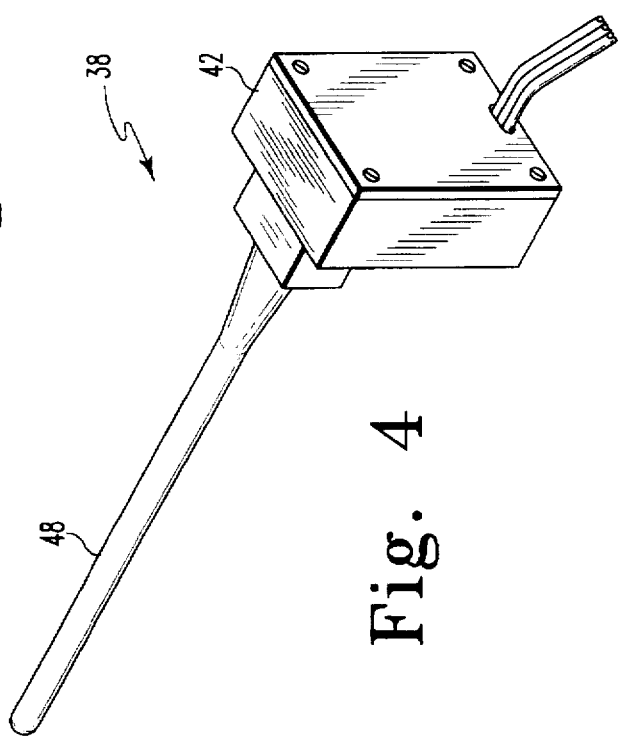
FIG. 4 is a perspective view of the second embodiment of the present invention.

Referring to FIG. 3, a second embodiment of the present invention is illustrated and indicated generally at 38. The twin beam displacement transducer 38 is similar to the displacement transducer 10 of FIGS. 1 and 2, however the displacement transducer 38 utilizes a single wire 40 which is bent into sections 40a and 40b. The bend in the wire 40 is located at the distal end thereof, and the proximal ends of the section 40a and section 40b are located within the housing 42. The proximal end 46 of the section 40b is rigidly attached to a circuit board 50. The circuit board 50 is rigidly attached to the housing 42 only at its lower end. The upper end of the circuit board 50 is therefore free to move as the circuit board 50 flexes. The section 40b therefore functions analogously to the fixed beam 14 of the displacement transducer 10. The proximal end 44 of the section 40a is free to slide within the housing 42. The section 40a therefore functions analogously to the sliding beam 16 of the displacement transducer 10 and this sliding motion may be detected by an appropriate photodetector. The wire 40 is covered with a rubber-like membrane 48 which allows the sections 40a and 40b to bend with displacement with the object in motion. However, because of the thinness of the wire 40, the displacement transducer 38 may more readily accommodate any motion of the object outside of the anticipated plane of motion. Displacement of the proximal end 46 may be sensed by any of the methods discussed hereinabove.

As shown in FIG. 3, the circuit board 50 is not attached at its upper end to the housing 42 and is free to flex therein. Coupling the circuit board 50 to the beam 40b therefore negates any relative motion between the beams 40a and 40b due to temperature changes and the resultant thermal expansions of the beams and the flexible membrane 48.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A transducer for measuring displacement of an object with respect to a reference point, comprising:

a neutral member having a proximal end fixed to the reference point and a distal end fixed to the object;

a sliding member having a free proximal end and a distal end fixed to the object;

wherein first displacement of the object in a first plane causes second displacement of the sliding member proximal end in a second, substantially orthogonal plane; and displacement measurement means for measuring the second displacement.

2. The transducer of claim 1, further comprising:

a housing fixed to the reference point and enclosing the neutral member proximal end, the sliding member proximal end and the displacement measurement means.

3. The transducer of claim 1, wherein the neutral member distal end is coupled to the sliding member distal end.

4. The transducer of claim 1, wherein the neutral member and the sliding member each comprise an elongate, flat piece of spring steel.

5. The transducer of claim 1, wherein the sliding member includes an aperture therethrough near the sliding member proximal end.

6. The transducer of claim 5, wherein the displacement measurement means comprises:

a light emitting diode positioned on a first side of the aperture; and a position sensing diode positioned on a second side of the aperture.

7. A transducer for measuring displacement of an object with respect to a reference point, comprising:

a neutral member having a proximal end fixed to the reference point and a distal end fixed to the object;

a sliding member having a free proximal end and a distal end fixed to the object;

wherein a first displacement of the object causes a second, smaller displacement of the sliding member proximal end; and displacement measurement means for measuring the second displacement.

8. The transducer of claim 7, wherein the first displacement occurs in a first plane and the second displacement occurs in a second, substantially orthogonal plane.

9. The transducer of claim 7, further comprising:

a housing fixed to the reference point and enclosing the neutral member proximal end, the sliding member proximal end and the displacement measurement means.

10. The transducer of claim 7, wherein the neutral member distal end is coupled to the sliding member distal end.

11. The transducer of claim 7, wherein the neutral member and the sliding member each comprise an elongate, flat piece of spring steel.

12. The transducer of claim 7, wherein the sliding member includes an aperture therethrough near the sliding member proximal end.

13. The transducer of claim 12, wherein the displacement measurement means comprises:

a light emitting diode positioned on a first side of the aperture; and a position sensing diode positioned on a second side of the aperture.

14. A transducer for measuring displacement of an object with respect to a reference point, comprising:

a flexible wire having a first end fixed to the reference point, a substantially 180 degree bend substantially at a midpoint of the wire and a free second ends wherein the bend is fixed to the object;

wherein first displacement of the object in a first plane causes second displacement of the second end in a second, substantially orthogonal plane; and displacement measurement means for measuring the second displacement.

15. The transducer of claim 14, further comprising:

a housing fixed to the reference point and enclosing the first end, the second end and the displacement measurement means.

16. The transducer of claim 14, wherein the flexible wire comprises spring steel.

17. The transducer of claim 14, wherein the flexible wire includes an aperture therein near the second end.

18. The transducer of claim 17, wherein the displacement measurement means comprises:

a light emitting diode positioned on a first side of the aperture; and a position sensing diode positioned on a second side of the aperture.

19. A transducer for measuring displacement of an object with respect to a reference point, comprising:

a flexible wire having a first end fixed to the reference point, a substantially 180 degree bend substantially at a midpoint of the wire and a free second end, wherein the bend is fixed to the object;

wherein a first displacement of the object causes second, smaller displacement of the second end; and displacement measurement means for measuring the second displacement.

20. The transducer of claim 19, wherein the first displacement occurs in a first plane and the second displacement occurs in a second, substantially orthogonal plane.

* * * * *

UNITED STATES PATENT AND TRADEMARK OFFICE
CERTIFICATE OF CORRECTION

PATENT NO : 5,757,497

DATED : May 26, 1998

INVENTOR(S): Jonathan W. Hill and Gregory A. Morehead

It is certified that error appears in the above-identified patent and that said Letters Patent is hereby corrected as shown below:

In column 6, line 25, please change "ends" to --end,--.

Signed and Sealed this

Ninth Day of February, 1999

*Attest:*

*Attesting Officer*

*Acting Commissioner of Patents and Trademarks*